United States Patent
Lajoie et al.

(10) Patent No.: US 6,796,173 B1
(45) Date of Patent: Sep. 28, 2004

(54) FUEL FLOWMETER

(75) Inventors: Marshall L. Lajoie, Fort Worth, TX (US); Pedro Fernandez, Dallas, TX (US); Charles D. Foran, Jr., Richardson, TX (US)

(73) Assignee: FTI Flow Technology, Inc., Bogart, GA (US)

( * ) Notice: Subject to any disclaimer, the term of this patent is extended or adjusted under 35 U.S.C. 154(b) by 528 days.

(21) Appl. No.: 09/414,867

(22) Filed: Oct. 8, 1999

Related U.S. Application Data

(60) Provisional application No. 60/103,654, filed on Oct. 9, 1998.

(51) Int. Cl.$^7$ .............................. G01F 3/04; G01F 15/00
(52) U.S. Cl. ....................................... 73/261; 73/861.77
(58) Field of Search .............................. 73/261, 861.74, 73/861.75, 861.77, 861.78, 861.79; 702/45–47

(56) References Cited

U.S. PATENT DOCUMENTS

| | | | |
|---|---|---|---|
| 4,338,816 A | 7/1982 | Neff | |
| 4,491,025 A | 1/1985 | Smith et al. | |
| 4,612,804 A | * 9/1986 | Colonnello | 73/861.74 X |
| 4,641,522 A | 2/1987 | Lopresti | |
| 4,738,143 A | 4/1988 | Cage et al. | |
| 4,738,144 A | 4/1988 | Cage | |
| 4,768,385 A | 9/1988 | Cage | |
| 4,798,092 A | 1/1989 | Lagergren et al. | |
| 4,802,364 A | 2/1989 | Cage et al. | |
| 4,815,318 A | 3/1989 | LoPresti | |
| 4,823,613 A | 4/1989 | Cage et al. | |
| 4,876,898 A | 10/1989 | Cage et al. | |
| 4,895,031 A | 1/1990 | Cage | |
| 4,911,010 A | 3/1990 | Foran, Jr. et al. | |
| 4,955,239 A | 9/1990 | Cage et al. | |
| 4,996,888 A | 3/1991 | Foran, Jr. et al. | |
| 5,027,653 A | 7/1991 | Foran, Jr. | |
| RE34,006 E | 7/1992 | Cage et al. | |
| 5,259,244 A | 11/1993 | Foran, Jr. | |
| 5,323,651 A | 6/1994 | Krampitz et al. | |
| 5,325,715 A | 7/1994 | Foran, Jr. | |
| 5,415,041 A | 5/1995 | Foran, Jr. et al. | |
| 5,689,071 A | 11/1997 | Ruffner et al. | |

* cited by examiner

Primary Examiner—Harshad Patel
(74) Attorney, Agent, or Firm—James Creighton Wray; Meera P. Narasimhan

(57) ABSTRACT

A fuel flowmeter has a flowmeter with rotating impellers with meshed lobes rotatable in partially cylindrical housings joined in a case having an inlet at one side and an outlet at an opposite side. Fuel moves in the inlet filling voids between lobes in both impellers and moves cylindrically around opposite partially cylindrical walls and turning the impellers until reaching the outlet. Flow conditioners in the inlet and outlet allows smooth flow, reducing turbulence and promoting lamellar flow into and out of the case. One of the rotors may have a magnetic marker. A transmitter with a Hall effect sensor is mounted on the case. A signal conditioning software is connected to the Hall effect sensor for adjusted transmitted information according to measured pulse rate and a standard flow. The transmitter has a temperature sensor, and a second signal conditioning software connected to the temperature sensor for adjusting transmitted flow rate signals according to a difference between sensed temperature and standard temperature. A signal cable is provided, and a junction box is connected to the signal cable. A flow computer is connected to the junction box for indicating fuel consumption. A remote control device is connected between the case and the transmitter. A fuel tank has a fuel supply line connected to the tank and a fuel pump is connected to the supply line. The flow computer calculates differences in flow between flows in the first and second flowmeters.

29 Claims, 2 Drawing Sheets

US 6,796,173 B1

FUEL FLOWMETER

This application claims the benefit of U.S. Provisional Application No. 60/103,654, filed Oct. 9, 1998.

BACKGROUND OF THE INVENTION

The invention relates to fuel flowmeters and provides accurate and reliable flow measurement of #2 diesel fuel.

Typical systems for net flow applications use two flowmeters, two temperature compensated sensors, and an indicator or datalogger to provide net rate and total. However, prior art flowmeters stop functioning when debris accumulates in the fuel supply lines thereby disrupting continuous fuel flow.

The present invention solves the prior art problems by maintaining continuous flow even if the flowmeter is jammed by debris in the fuel supply—the bypassed fuel flow is sufficient to maintain engine operation from idle to full load.

SUMMARY OF THE INVENTION

The new system provides accurate and reliable flow measurement of #2 diesel fuel. For net flow applications, the typical system uses two flowmeters, two temperature compensated sensors, and an indicator or datalogger to provide net rate and total. The four available sizes are consistent with the ranges needed to provide flow measurement for most large diesel engines. Each meter is designed and built specifically for this application to provide optimal results. Additionally, its specialized internal geometry allows fuel flow to continue, even if the flowmeter is jammed by debris in the fuel supply—the bypassed fuel flow is sufficient to maintain engine operation from idle to full load.

The new systems connects to ¼", ½" and 1" line sizes specifically for #2 diesel fuel. Reference accuracy is ±1% of net fuel consumption from 40° F. to 160° F. (4° C. to 70° C.) operating temperature for the two meter system (supply/return). The meters have built-in inlet flow conditioners for improved accuracy and piping insensitivity. The new system provides fuel temperature measurement and a temperature compensated output to 60° F. Each meter has only two moving parts and provides in-line maintenance and easy installation. Non-clogging meters prevent starving the engine if a flowmeter jams. The system is a non-intrusive sensor and provides pulse-out or serial communications.

To make the system more accurate, software is imbedded in transmitters connected to the meters.

During calibration, each meter is subjected to a series of actual flow conditions at many flow rates and temperatures spanning the entire range for which the flowmeter is being calibrated. A typical calibration may consist of 84 data points.

Each data point consists of a temperature, a raw flow sensor signal (typically a square wave frequency representing the rotational velocity of the flowmeter impellers), and a "master meter" flow rate. The "master meter" flow rate represents the actual volumetric flow rate, compensated for temperature, viscosity and density effects such that the volumetric rate given is what it would have been had the temperature been 60° F.

The "raw" calibration data can be considered to form a three-dimensional surface, with raw flow sensor frequency and temperature representing the x and y coordinates, and the "master meter" flow rate representing the z coordinate (in a three-dimensional Cartesian coordinate system).

The data is then extended through extrapolation to make the surface (its projection onto the x-y plane) appear rectangular when viewed along the z axis.

This curved surface, which represents the actual flow rate as a function of frequency and temperature, is divided into a number of subsections. Each subsection is then "fit" by a multi-variate polynomial of sufficient order, whose coefficients are determined by standard mathematical means. Additional constraints are placed on the polynomials such that the ends which join with adjacent sections must match in value, first and second derivatives. This insures that the surface being modeled by the series of polynomials has no discontinuities at the transition points from one sub-section of the surface to the next.

This method of representing a continuous data set by a series of polynomials is known as splining, and the individual subsections are known as splines.

Knowing the frequency input from the flowmeter sensor and the temperature of the substance being measured, one can select the set of coefficients of the multi-variate polynomial which represent the subsection of the surface of interest. The frequency and temperature are applied to the polynomial using the appropriate coefficients, and the polynomial is evaluated, resulting in a close reproduction of the flow rate experienced by the flowmeter under the same conditions during calibration.

The order of the polynomials, the number of splines and the placement of the "breakpoints" between one spline and the next can all be varied to optimize the "fit" of the splined model to more closely reproduce the resulting data obtained during calibration.

These and further and other objects and features of the invention are apparent in the disclosure, which includes the above and ongoing written specification, with the drawings.

DETAILED DESCRIPTION OF THE PREFERRED EMBODIMENTS

Figure 1:
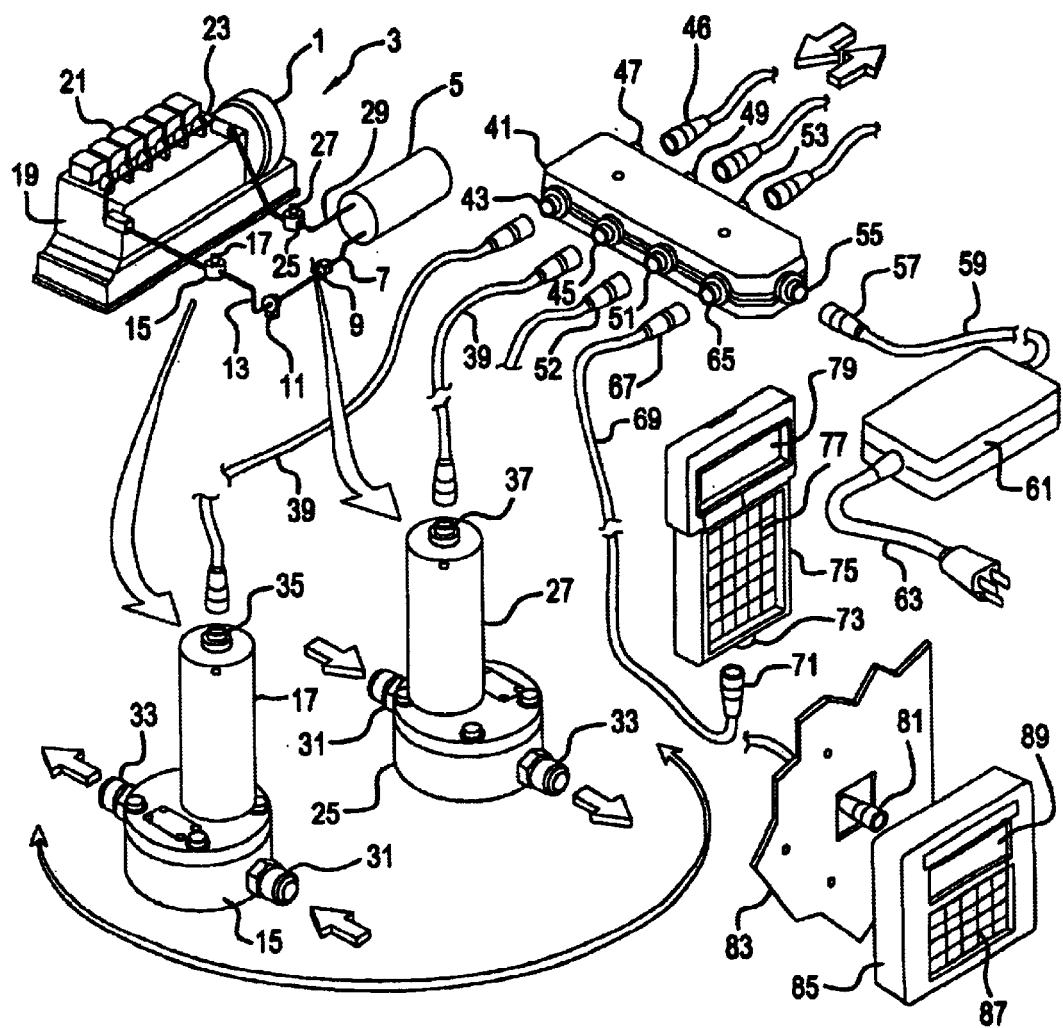
FIG. 1 is a schematic representation of the system of the present invention.
Figure 2:
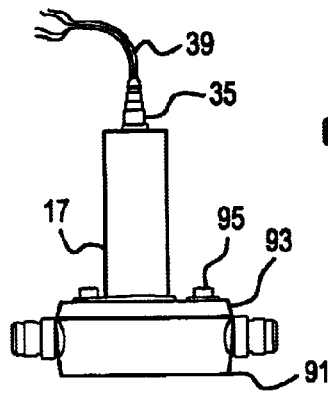
FIG. 2 is a side elevation of a flowmeter and transmitter with a built-in flow conditioner.
Figure 3:
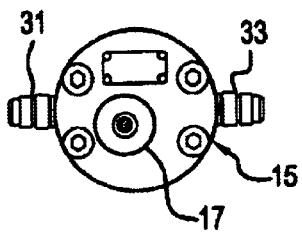
FIG. 3 is a plan view of the formula and transmitter shown in FIG. 2.

Referring to FIG. 1, a diesel engine is generally indicated by the numeral 1, and the present fuel metering system is generally indicated by the numeral 3. Diesel fuel is stored in a tank 5 and is drawn out of the tank through a fuel line 7 by fuel pump 9. A filter 11 filters the fuel, and line 13 provides the filtered fuel to the supply flowmeter 15 which has a transmitter 17. The fuel flows through the injection pump 19 through main supply line 21 to injectors 23. Excess fuel flows through the return flowmeter 25 (with a transmitter 27) in the return line 29 to the fuel tank 5.

As shown in the enlarged detail in FIG. 1, the flowmeters have flow conditioning input connectors 31 and output connectors 33. Transmitters 17 and 27 are connected to the flowmeters and have output ports 35 and 37, which are connected by five-pin micro-C cables 39 to five-pin inputs on junction box 41. The outputs from connectors 35 and 37 on transmitters 17 and 27 are connected to inputs 43 and 45, respectively. Additional cable connectors 46 are used to connect a second engine to junction box inputs 47 and 49. Similar cable connectors 52 connect optional RPM sensors from the first and second engines respectively to inputs 51 and 53 of the junction box 41. Alternatively, the inputs 51 and 53 may be used to connect cables from supply and return meter transmitters of a third engine.

Input 55 is connected to the connector 57 of a power cable 59 from power supply 61. The power supply 63 to the power supply 61 may be 12 volt or 24 volt or an AC power supply. Alternatively line 59 may be supplied from a regulated 12 volt power source.

Output 65 of junction box 41 is connected to a connector 67 of output line 69. In one form, the output connector 71 is connected to the input 73 of a hand held meter 75, with input keys 77 and display 79. Alternatively, an output connector 81 of output line 69 may be mounted on a panel 83 for connection to a panel mounted output meter 85 with input keys 87 and a display 89.

Referring to FIGS. 2–6, a flowmeter 15 or 27 has a base or housing 91 and a cover 93 connected by bolts 95 to the base.

Figure 4:
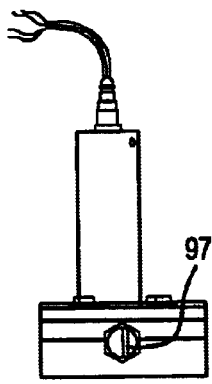
FIG. 4 is a end view of the flowmeter and transmitter shown in FIGS. 2 and 3.
Figure 5:
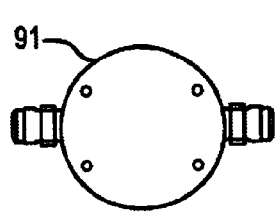
FIG. 5 is a bottom view of the flowmeter shown in FIGS. 2, 3 and 4.
Figure 6:
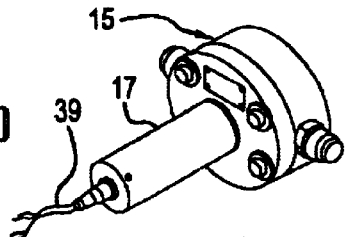
FIG. 6 is a perspective view of the flowmeter shown in FIGS. 2–5.

Inlet fitting 31 has a built-in inlet flow conditioner. The inlet connector 31 and the outlet connector 33 are provided for connecting to the fuel flow line of sizes which are in use. Transmitter 17 has sensors connected directly to the cover 93 of the housing 91, and has a five-pin output 35 for connection to signal cable 39. FIG. 4 shows conditioning openings 97 in the inlet 31.

Figure 7:
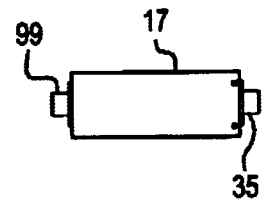
FIG. 7 is an elevation of the transmitter.
Figure 8:
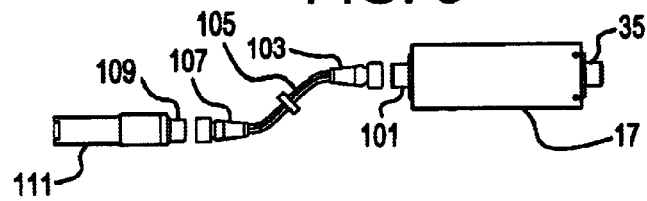
FIG. 8 is an elevation of the transmitter schematically showing connections to a remote sensor.

Referring to FIG. 7, an integral flow transmitter 17 has an output connector 35 at one end. The other end has a hall effect sensor and temperature sensor 99 in a connector which extends into the cover 93 of the meter. In high temperature applications, such as shown in FIG. 8, the integral flow transmitter 17 has a connector 101 in place of the hall effect sensor and temperature sensor 99. The connector 101 connects to a connector 103 of cable 105, which has an outer end connector 107 for connecting to a connector 109 on a remote sensor 111. The remote sensor 111 has a hall effect sensor and temperature sensor for connecting to a fuel meter in a high temperature environment or an environment in which the transmitter cannot easily be positioned near the fuel line.

Figure 9:
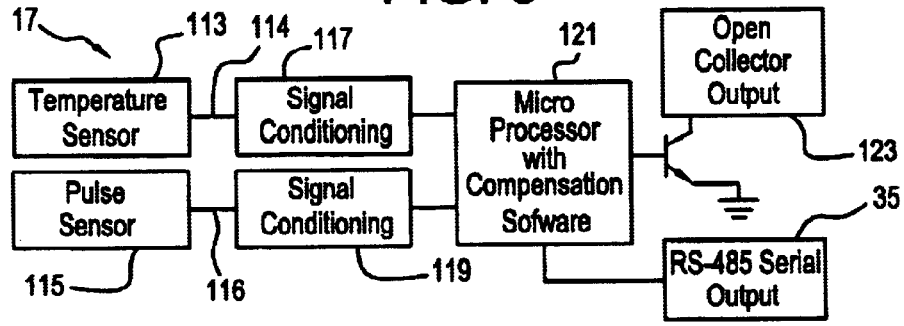
FIG. 9 is a schematic flow diagram showing pulse sensors and temperature sensors signal conditioning, microprocessors and output.

As shown in FIG. 9, the temperature sensor 113 and the pulse sensor or hall effect sensor 115 are mounted in the same integrated sensor 99 or remote sensor 111. The signals 114 and 116 from the sensors are conditioned in signal conditioners 117 and 119, which occurs in the transmitter.

Microprocessor 121 with compensation software is contained within the transmitter 17. The microprocessor 121 also has an open collector output for providing preconditioned pulses at 20 milliamps fully conditioned and linearalized for flows at 60° C. The output on the RS-485 serial output 35 includes both temperature and conditioned and linearalized flow rates for display on hand held or panel mounted flow computers 75 and 85.

Figure 10:
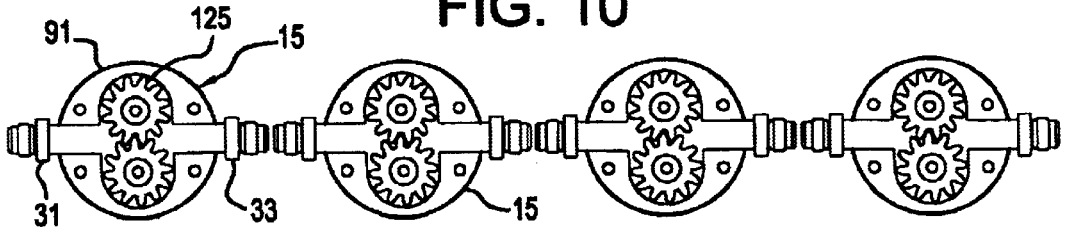
FIG. 10 is a schematic representation of the flowmeter operation.

As shown in FIG. 10, flowmeters 15 use two rotating impellers 125 driven by the flowing fuel. Magnets imbedded in the impellers activate a non-intrusive sensor which generates a pulsed output signal. Each pulse represents a known volume of fuel that is captured between the lobes of the impellers. The current fuel temperature is also measured by the non-intrusive sensor. Both the pulse and temperature data are sent to a microprocessor in the transmitter. The pulse data is then compensated for the temperature effects on the fuel viscosity, thereby providing a highly linearalized output signal. The unique flowmeters makes them impervious to pressure pulsations caused by engine fuel injectors.

Chart 1 provides system specifications.

Graphs and Tables 1 and 2 show meter calibrations in gallons per hour at increasing degrees centigrade.

Two and three-page calibration Charts 1 and 2 show calibration of individual meters.

The meters have clearances which make them non-linear according to the viscosity of the fuel. The calibration charts and the embedded software in the microprocessors within the transmitters provide data which is preconditioned and linearalized to 60° C. Because of the clearances in the meter, the meters are completely fail safe so that the engines can continue to run notwithstanding jamming of the meters by debris in the fuel supply.

While the invention has been described with reference to specific embodiments, modifications and variations of the invention may be constructed without departing from the scope of the invention.

We claim:

1. Fuel flowmeter apparatus comprising a first flowmeter, partially cylindrical housings, rotating impellers having meshed lobes rotatable in the partially cylindrical housings joined in a case having an inlet at one side and an outlet at an opposite side, fuel moving in the inlet and filling voids between the lobes in the impellers and moving cylindrically around opposite partially cylindrical walls and turning the impellers until reaching the outlet, the inlet and the outlet having flow conditioners for smoothing flow, reducing turbulence and promoting lamellar flow into and out of the case, a magnetic marker on at least one of the impellers, a transmitter mounted on the case, the transmitter having a Hall effect sensor for sensing passage of the marker as a pulse, a first signal conditioning software connected to the Hall effect sensor for adjusting transmitted information according to measured pulse rate and a standard flow, the transmitter having a temperature sensor, and a second signal conditioning software connected to the temperature sensor for adjusting transmitted flow rate signals according to a difference between sensed temperature and standard temperature.

2. The fuel flowmeter apparatus of claim 1, further comprising a signal cable connected to the transmitter, a junction box connected to the signal cable, and a flow computer connected to the junction box for indicating fuel consumption.

3. The fuel flowmeter apparatus of claim 1, wherein the case comprises a base in which the partially cylindrical housings are formed and wherein the inlet and the outlet flow conditioners are built in flow conditioners connected to opposite sides of the base, a cover connected to the base and enclosing the housings, and impellers freely positioned in the housing with the lobes of the impellers intermeshing, wherein the transmitter comprises a cylindrical enclosure extending from the cover, wherein the Hall effect sensor and temperature sensor are mounted in the cover, and wherein the first and the second signal conditioning softwares are mounted in the cylindrical enclosure.

4. The fuel flowmeter apparatus of claim 1, further comprising a remote connector cable connected between the case and the transmitter, and wherein the Hall effect sensor and the temperature sensor are mounted in the cable and are connected to the housing.

5. The fuel flowmeter apparatus of claim 1, further comprising a diesel fuel tank, a diesel fuel supply line connected to the tank, a fuel pump connected to the supply line, a fuel filter connected to the supply line, the fuel supply line connected to inlet flow conditioners and connected to a fuel injector for supplying diesel fuel to the fuel injector, a fuel return line connected to the fuel injector and to the tank, a second flowmeter connected to the fuel return line and a second transmitter connected to the second flowmeter.

6. The fuel flowmeter apparatus of claim 5, wherein the second flowmeter has a second temperature sensor and a second Hall effect sensor, and first and second unique signal conditioning software connected to the second Hall effect sensor and to the second temperature sensor respectively.

7. The fuel flowmeter apparatus of claim 6, further comprising a signal cable connected to the transmitter, a junction box connected to the signal cable, a flow computer connected to the junction box for indicating fuel consumption, a second signal cable connected to the second transmitter and connected to the junction box, wherein the flow computer calculates differences in flow between flows in the first and second flowmeters.

8. The fuel flowmeter apparatus of claim 7, wherein the conditioning software for each meter varies outputs from the Hall effect sensors and temperature sensors to the signal cables according to precomparison with specific standards for each individual flowmeter and transmitter combination.

9. The fuel flowmeter apparatus of claim 8, further comprising third and fourth signal cables connected to the junction box and to third and fourth transmitters on third and fourth flowmeters on a second fuel supply, and return lines for indicating on the computer full consumption of a second diesel engine.

10. The fuel flowmeter apparatus of claim 9, further comprising fifth and sixth signal cables connected to the junction box and to RPM senders on the first and second diesel engines.

11. The fuel flowmeter apparatus of claim 9, further comprising fifth and sixth signal cables connected to fifth and sixth transmitters on fifth and sixth flowmeters on third fuel supply and return lines for indicating fuel consumption to the flow computer.

12. A method for determining fluid flow rate, comprising providing a first flowmeter with rotating impellers having meshed lobes rotatable in partially cylindrical housings joined in a case having an inlet at one side and an outlet at an opposite side, moving the fuel in the inlet and filling voids between the lobes in the impellers and moving the fuel cylindrically around opposite partially cylindrical walls and turning the impellers until reaching the outlet, providing flow conditioners in the inlet and the outlet for smoothing flow, reducing turbulence and promoting lamellar flow into and out of the case, providing a magnetic marker on at least one of the impellers, mounting a transmitter on the case, providing a Hall effect sensor in the transmitter for sensing passage of the marker as a pulse, providing a first signal conditioning software connected to the Hall effect sensor, adjusting transmitted information according to measured pulse rate and a standard flow, providing a temperature sensor in the transmitter, and connecting a second signal conditioning software to the temperature sensor for adjusting transmitted flow rate signals according to a difference between sensed temperature and standard temperature.

13. The method of claim 12, further comprising connecting a signal cable to the transmitter, connecting a junction box to the signal cable, and connecting a flow computer to the junction box for indicating fuel consumption.

14. The method of claim 12, the providing comprising providing the case comprising a base in which the partially cylindrical housings are formed and wherein the inlet and outlet flow conditioners are built in, connecting flow conditioners to opposite sides of the base, connecting a cover to the base and enclosing the housings, and freely positioning impellers in the housing with lobes of the impellers intermeshing, providing the transmitter with a cylindrical enclosure extending from the cover, mounting the Hall effect sensor and temperature sensor in the cover, and mounting the first and second signal conditioning software in the cylindrical enclosure.

15. The method of claim 12, further comprising connecting a remote connector cable between the case and the transmitter, and mounting the Hall effect sensor and the temperature sensor in the cable and connecting them to the housing.

16. The method of claim 12, further comprising providing a diesel fuel tank, connecting a diesel fuel supply line to the tank, connecting a fuel pump to the supply line, connecting a fuel filter to the supply line, connecting the fuel supply line to inlet flow conditioners and to a fuel injector for supplying diesel fuel to the fuel injector, connecting a fuel return line to the fuel injector and to the tank, connecting a second flowmeter to the fuel return line, and connecting a second transmitter to the second flowmeter.

17. The method of claim 16, providing the second flowmeter with a second temperature sensor and a second Hall effect sensor, and connecting first and second unique signal conditioning software to the second Hall effect sensor and to the second temperature sensor respectively.

18. The method of claim 17, further comprising connecting a signal cable to the transmitter, connecting a junction box to the signal cable, connecting a flow computer to the junction box for indicating fuel consumption, connecting a second signal cable to the second transmitter and to the junction box, and providing the flow computer to calculate differences in flow between flows in the first and second flowmeters.

19. The method of claim 18, further providing the conditioning software for each meter varying outputs from the Hall effect sensors and temperature sensors to the signal cables according to precomparison with specific standards for each individual flowmeter and transmitter combination.

20. The method of claim 19, further comprising connecting third and fourth signal cables to the junction box and to third and fourth transmitters on third and fourth flowmeters on a second fuel supply, and providing return lines for indicating on the computer full consumption of a second diesel engine.

21. The method of claim 20, further comprising connecting fifth and sixth signal cables to the junction box and to RPM senders on the first and second diesel engines.

22. The method of claim 20, further comprising connecting fifth and sixth signal cables to fifth and sixth transmitters on fifth and sixth flowmeters on third fuel supply and return lines for indicating fuel consumption to the flow computer.

23. A fuel flow measuring system comprising a computer having a display, a junction box having plural serial connectors, a computer cable connected to the computer and to a first serial connector of the junction box, a power supply connected to the junction box, plural transmitter cables connected to the junction box serial connectors, a flowmeter, a transmitter connected to the flowmeter, a microprocessor in the transmitter having a serial output, the serial output connected to a first transmitter cable, a temperature sensor connected to the transmitter, a pulse sensor connected to the transmitter, signal conditioners interconnecting the temperature and pulse sensors with the microprocessor, the power supply supplying power to the transmitter via the transmitter cable, the temperature sensor providing conditioned flowmeter temperature signals to the microprocessor, the pulse sensor providing conditioned rotor angular speed pulse signals to the microprocessor, the microprocessor supplying temperature and rotor speed pulse signals through the transmitter cables, junction box and computer cable to the computer, and the computer computing real time, average and total fuel usage and displaying fuel usage, as required.

24. The measuring system of claim 23, wherein the flowmeter comprises a flowmeter having a chamber, fuel lines connected radially to the chamber, rotors with meshing lobes mounted in the chamber, and magnets embedded in the rotors for creating pulses as the lobes pass the pulse sensor.

25. The measuring system of claim 23, further comprising a second transmitter connected to a second flowmeter, a second microprocessor in the second transmitter having a second serial output, the second serial output connected to a second transmitter cable, a second temperature sensor connected to the second transmitter, a second pulse sensor connected to the second transmitter, signal conditioners interconnecting the second temperature and pulse sensors with the second microprocessor, the power supply supplying power to the transmitter via the second transmitter cable, the temperature sensor providing conditioned second flowmeter temperature signals to the second microprocessor, the second pulse sensor providing conditioned rotor angular speed pulse signals to the second microprocessor, the second microprocessor supplying temperature and rotor speed pulse signals through the second transmitter cable, junction box and computer cable to the computer for computing and displaying real time, average and total fuel usage.

26. The measuring system of claim 25, further comprising an RPM meter connected to the junction box.

27. The measuring system of claim 25, further comprising an engine having a fuel inlet connected to the first transmitter and having a fuel outlet connected to the second transmitter.

28. The measuring system of claim 27, further comprising a second engine having a second fuel inlet and a second fuel outlet, and having third and fourth flowmeters respectively connected to the second fuel inlet and to the second fuel outlet, and third and fourth transmitters connected to the third and fourth flowmeters respectively, and third and fourth transmitter cables connected to the third and fourth transmitters and to the junction box.

29. The measuring system of claim 28, further comprising first and second RPM sensors connected respectively to the first and second engines and through signal conditioners to the junction box and the computer cable to the computer for supplying engine RPM signals to the computer.

* * * * *